US011349122B2

(12) United States Patent
Kong et al.

(10) Patent No.: US 11,349,122 B2
(45) Date of Patent: May 31, 2022

(54) POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: Samsung SDI Co., Ltd., Yongin-si (KR)

(72) Inventors: Youngsun Kong, Yongin-si (KR); Kiyong Ahn, Yongin-si (KR); Jinyoung Kim, Yongin-si (KR); Sung Ho Choo, Yongin-si (KR); Seonyoung Kwon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 310 days.

(21) Appl. No.: 16/817,163

(22) Filed: Mar. 12, 2020

(65) Prior Publication Data
US 2020/0295368 A1    Sep. 17, 2020

(30) Foreign Application Priority Data

Mar. 15, 2019  (KR) .......................... 10-2019-0030036

(51) Int. Cl.
| | |
|---|---|
| *H01M 4/525* | (2010.01) |
| *H01M 4/505* | (2010.01) |
| *H01M 10/0525* | (2010.01) |
| *H01M 4/02* | (2006.01) |

(52) U.S. Cl.
CPC .......... *H01M 4/525* (2013.01); *H01M 4/505* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2003/0170540 A1 | 9/2003 | Ohzuku et al. | |
| 2005/0221180 A1 | 10/2005 | Shimura et al. | |
| 2009/0111030 A1* | 4/2009 | Hojo ................ | H01M 10/0564 320/128 |

(Continued)

FOREIGN PATENT DOCUMENTS

| | | |
|---|---|---|
| EP | 1296391 A1 | 3/2003 |
| EP | 2963708 A1 | 1/2016 |

(Continued)

OTHER PUBLICATIONS

EPO Extended Search Report dated Jul. 29, 2020, for corresponding European Patent Application No. 20163171.0 (7 pages).

(Continued)

*Primary Examiner* — Gregg Cantelmo
(74) *Attorney, Agent, or Firm* — Lewis Roca Rothgerber Christie LLP

(57) ABSTRACT

A positive active material for a rechargeable lithium battery includes nickel-based lithium transition metal oxide secondary particles, in which a plurality of primary particles are aggregated. The primary particles include polycrystalline primary particles composed of 2 to 10 single crystals, and each of the single crystals has a particle diameter of about 0.5 μm to about 3 μm.

16 Claims, 8 Drawing Sheets

(56) References Cited

U.S. PATENT DOCUMENTS

| | | | |
|---|---|---|---|
| 2014/0329147 A1* | 11/2014 | Mitsumoto | H01M 4/131 |
| | | | 429/223 |
| 2015/0010819 A1 | 1/2015 | Lee et al. | |
| 2015/0086788 A1* | 3/2015 | Ladd | C09D 5/004 |
| | | | 428/425.9 |
| 2015/0243978 A1* | 8/2015 | Shon | H01M 4/485 |
| | | | 423/594.15 |
| 2016/0006031 A1 | 1/2016 | Kaseda et al. | |
| 2017/0125809 A1 | 5/2017 | Kim et al. | |
| 2020/0161650 A1* | 5/2020 | Park | H01M 4/525 |

FOREIGN PATENT DOCUMENTS

| | | |
|---|---|---|
| EP | 3162765 A1 | 5/2017 |
| JP | 2001-085006 A | 3/2001 |
| KR | 10-2005-0084919 A | 8/2005 |
| KR | 10-2013-0078571 A | 7/2013 |
| KR | 10-2015-0006283 A | 1/2015 |
| KR | 10-2015-0121010 A | 10/2015 |

OTHER PUBLICATIONS

Korean Office action dated Dec. 21, 2021, for corresponding Korean Patent Application No. 10-2019-0030036 (5 pages).

\* cited by examiner

POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application claims priority to and the benefit of Korean Patent Application No. 10-2019-0030036, filed in the Korean Intellectual Property Office on Mar. 15, 2019, the entire content of which is incorporated herein by reference.

BACKGROUND

1. Field

One or more aspects of embodiments of the present disclosure are related to a positive active material for a rechargeable lithium battery, a method of preparing the same, and a rechargeable lithium battery including the same.

2. Description of the Related Art

In order to meet size (e.g., down-sizing) and high performance of various devices, rechargeable lithium batteries have become increasingly important power sources for their high energy densities, compact sizes, and reduced weights. The high capacity, high voltage stability, and high temperature stability of rechargeable lithium batteries are also important for electric vehicle applications and/or the like. Various positive active materials have been investigated for use in rechargeable lithium batteries. Nickel-based lithium transition metal oxides including Ni, Co, Mn, etc. provide a higher discharge capacity per unit weight than $LiCoO_2$, but concurrently (e.g., simultaneously) provide a lower capacity per unit volume due to the low packing density the positive active material. In addition, in the case of a rechargeable lithium battery using the nickel-based lithium transition metal oxide, stability during high voltage driving may be reduced. Therefore, in order to achieve a high-capacity rechargeable lithium battery, a nickel-based lithium transition metal oxide having improved packing density and thermal stability is desired, so that a mixture density of the positive electrode plate, cycle-life characteristics, and stability characteristics under high voltage driving may be improved.

SUMMARY

One or more aspects of embodiments of the present disclosure are directed toward a positive active material having improved crystal structure phase stability.

One or more aspects of embodiments of the present disclosure are directed toward a method of preparing the positive active material.

One or more aspects of embodiments of the present disclosure are directed toward a rechargeable lithium battery including the positive active material having improved high voltage cycle-life characteristics.

One or more example embodiments of the present disclosure provide a positive active material for a rechargeable lithium battery including nickel-based lithium transition metal oxide secondary particles in which a plurality of primary particles are aggregated, wherein the primary particles each include polycrystalline primary particles composed of 2 to 10 single crystals, and each of the single crystals has a particle diameter of about 0.5 μm to about 3 μm.

The polycrystalline primary particles may be 30% or more of the total number of primary particles.

The primary particle may have a particle diameter of about 2 μm to about 5 μm.

The secondary particle may have a particle diameter of about 10 μm to about 40 μm.

The positive active material may have a peak intensity ratio I(003)/I(101) of about 9 to about 11 measured by X-ray diffraction analysis.

The positive active material may have a peak intensity ratio I(003)/I(104) of about 1.6 to about 2.0 measured by X-ray diffraction analysis.

The electrode plate including the positive active material may have a peak intensity ratio I(003)/I(104) of about 3.8 to about 4.5 measured by X-ray diffraction analysis.

The nickel-based lithium transition metal oxide may be a compound represented by Chemical Formula 1:

$$Li_xNi_{1-a-c}Co_aMn_bM_cO_2 \qquad \text{Chemical Formula 1}$$

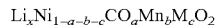

In Chemical Formula 1, 0.9≤x≤1.2, 0<a≤0.4, 0≤c≤0.1, and

M is at least one element selected from magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), chromium (Cr), iron (Fe), vanadium (V), and a rare earth element.

The nickel-based lithium transition metal oxide may include $LiNi_{0.9}Co_{0.08}Al_{0.02}O_2$, $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$, $Li_{1.01}Ni_{0.8}Co_{0.1}Mn_{0.1}O_2$, or a combination thereof.

One or more example embodiments of the present disclosure provide a method of preparing the positive active material that includes: mixing an aqueous solution including a nickel compound and a cobalt compound with a basic solution, performing a co-precipitation reaction to prepare a resultant, drying the resultant to prepare a transition metal precursor; mixing the transition metal precursor, a lithium compound, and an inert surfactant, and performing a heat-treatment to prepare the positive active material.

The transition metal precursor may have a tap density of greater than about 2.0 g/cm³ and less than or equal to about 2.5 g/cm³.

The transition metal precursor may be a compound represented by Chemical Formula 2, Chemical Formula 3, or a combination thereof:

$$Li_xNi_{1-a-c}Co_aMn_bM_c(OH)_2 \qquad \text{Chemical Formula 2}$$

$$Li_xNi_{1-a-c}Co_aMn_bM_cO. \qquad \text{Chemical Formula 3}$$

In Chemical Formula 2 and Chemical Formula 3, 0.9≤x≤1.2, 0<a≤0.4, 0≤c≤0.1, and

M may be at least one element selected from Mg, Ca, Sr, Ba, Ti, Zr, Nb, Mo, W, Zn, Al, Si, Cr, Fe, V, and a rare earth element.

The transition metal precursor and the lithium compound may be mixed so that a Li/metal (transition metals excluding Li) mole ratio is greater than about 1.0 and less than about 1.1.

The lithium compound may be lithium hydroxide, lithium carbonate, lithium sulfate, lithium nitrate, or a combination thereof.

The inert surfactant may be included in an amount of less than or equal to about 1 part by weight based on 100 parts by weight of the transition metal precursor.

The heat-treatment may be maintained for about 15 hours to about 25 hours at a temperature of greater than about 800° C. and less than 900° C.

One or more example embodiments of the present disclosure provide a rechargeable lithium battery including a positive electrode including the positive active material; a negative electrode including a negative active material; and an electrolyte.

The battery capacity may be improved by increasing the density of the positive active material, and structural stability of the positive active material may be improved, thereby reducing gas generation. Accordingly, thermal stability and cycle-life characteristics, for example high-voltage cycle-life characteristics, may be improved.

DETAILED DESCRIPTION

Figure 1:
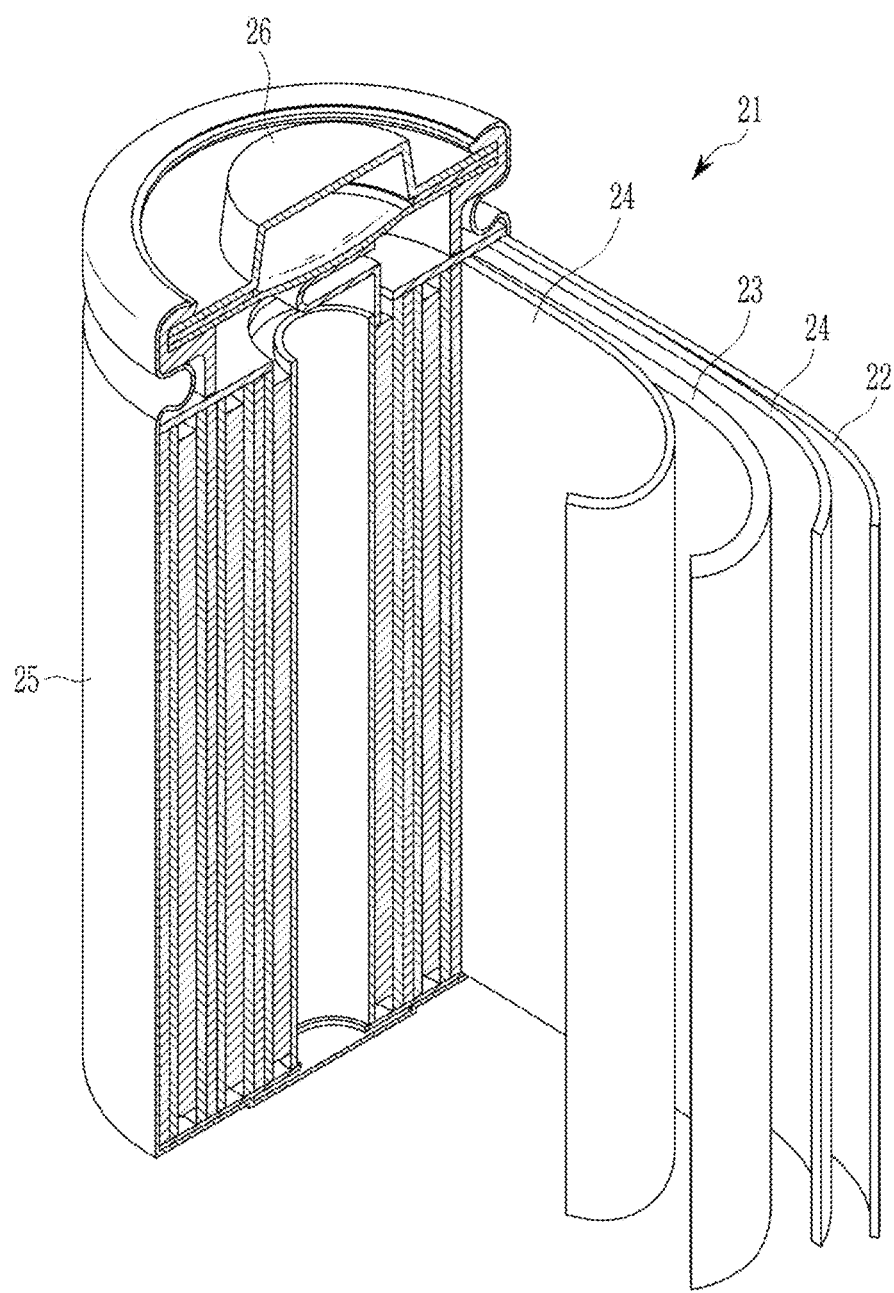
FIG. 1 is a schematic perspective view illustrating a structure of a rechargeable lithium battery according to an embodiment.

Hereinafter, embodiments of the present disclosure will be described in more detail. However, these embodiments are exemplary, the present disclosure is not limited thereto and the present disclosure is defined by the scope of claims.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, expressions such as "at least one of", "one of", and "selected from", when preceding a list of elements, modify the entire list of elements and do not modify the individual elements of the list.

As used herein, the term "and/or" includes any and all combinations of one or more of the associated listed items. Further, the use of "may" when describing embodiments of the present disclosure refers to "one or more embodiments of the present disclosure".

A positive active material for a rechargeable lithium battery according to an embodiment includes nickel-based lithium transition metal oxide secondary particles in which a plurality of primary particles are aggregated, wherein the primary particles include polycrystalline primary particles composed of 2 to 10 single crystals, and the (e.g., each) single crystal has a particle diameter of about 0.5 μm to about 3 μm.

The (e.g., each) single crystal may have a particle diameter of about 0.5 μm to about 3 μm, for example, greater than or equal to about 0.5 μm, greater than or equal to about 0.6 μm, greater than or equal to about 0.7 μm, greater than or equal to about 0.8 μm, greater than or equal to about 0.9 μm, or greater than or equal to about 1 μm, and less than or equal to about 3 μm, less than or equal to about 2.8 μm, less than or equal to about 2.6 μm, less than or equal to about 2.5 μm, less than or equal to about 2.3 μm, less than or equal to about 2.1 μm, or less than or equal to about 2 μm. When the particle diameter of the single crystal is within the above-described ranges, the crystal density of the single crystal is high, such that structural stability of the crystal may be improved, and mixture density and stability during high voltage driving (e.g., under high voltage charging and discharging conditions) of the positive active material including the same may be improved. As a result, battery capacity and high-voltage cycle-life characteristics may be improved.

In the present disclosure, the term "particle diameter" may refer to the average particle diameter (D50) as determined from the median (e.g., about 50%) value of the volumetric particle size distribution curve. The particle diameter may be measured using any suitable method, such as an electron microscopy examination using a scanning electron microscopy (SEM) or a field emission scanning electron microscopy (FE-SEM), or a laser diffraction method. The particle diameter may be measured using the laser diffraction method as follows. The particles to be measured are dispersed in a dispersion medium and then introduced into a commercially available laser diffraction particle size measuring apparatus (for example, MT 3000 by Microtrac), irradiated by ultrasonic waves at about 28 kHz and an output of about 60 W, and the average particle diameter (D50) corresponding to the 50% reference of the particle size distribution in a measuring apparatus may be calculated. The primary particles comprise (e.g. are) polycrystalline primary particles that are each composed of 2 to 10 single crystals, for example 2 or more, or 3 or more, and 10 or fewer, 9 or fewer, 8 or fewer, 7 or fewer, 6 or fewer, or 5 or fewer single crystals. Accordingly, the structural stability of the positive active material may be improved by the single crystals having the same orientation (single orientation), for example, when the crystal domains within the primary particle are aligned so that the effective number of single crystals is within the above-described range. In addition, because the grain boundaries in the primary particles (e.g., between crystals) may provide a migration path for lithium ions, structural stability of the positive active material may be improved and capacity characteristics of the battery may be improved.

A single crystal may grow into (form) a primary particle. However, in the present disclosure, a positive active material including polycrystalline primary particles may be produced by controlling a growth rate of the crystals forming the primary particles, by setting temperature conditions so that the polycrystals do not fuse across grain boundary surfaces, and by mixing a high density precursor, an excess of lithium compound, and an inert surfactant.

The polycrystalline primary particles may be or form about 30% or more, about 30% to about 90%, about 30% to about 80%, about 30% to about 70%, or about 30% to about 60% of the total number of the primary particles. In some embodiments, for example, a remaining amount of the primary particles may be single crystalline.

The primary particle may have a particle diameter of about 2 μm to about 5 μm, for example, about 3 μm to about 5 μm. When the particle diameter of the primary particles is within the above range, a mixture density of the positive active material may be increased, thereby improving capacity characteristics of the battery.

The particle diameter of the secondary particles may be about 10 μm to about 40 μm, for example, about 10 μm to about 20 μm, or about 10 μm to about 15 μm. When the size of the secondary particles is within the above range, a mixture density of the positive active material may be increased to improve the capacity characteristics of the battery.

The size of the single crystal, the number of polycrystalline primary particles, the number of single crystals constituting the polycrystalline primary particles, the size of the primary particles, and the size of the secondary particles may each be measured as based on (within) a cross section of a nickel-based lithium transition metal oxide secondary particle.

The nickel-based lithium transition metal oxide may be a compound represented by Chemical Formula 1:

          Chemical Formula 1

In Chemical Formula 1,
$0.9 \leq x \leq 1.2$, $0 < a \leq 0.4$, $0 \leq c \leq 0.1$, and
M may be at least one element selected from magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), chromium (Cr), iron (Fe), vanadium (V), and a rare earth element.

The nickel-based lithium transition metal oxide may be or include, for example, $LiNi_{0.9}Co_{0.08}Al_{0.02}O_2$, $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$, $Li_{1.01}Ni_{0.8}Co_{0.1}Mn_{0.1}O_2$, or a combination thereof.

The peak intensity ratio I(003)/I(101) measured by X-ray diffraction (XRD) analysis of the positive active material may be about 9 to about 11, for example, about 10 to about 11, or about 10 to about 10.5.

In the X-ray diffraction analysis, the term "peak intensity" of e.g., I(003) and I(101) refers, for example, to the intensity I(003) of the XRD peak arising from the (003) crystal plane and the intensity I(101) of the XRD peak arising from the (101) crystal plane, respectively. The term "peak intensity ratio" I(003)/I(101) refers to an intensity ratio of the (003) plane peak with respect to the (101) plane peak, and is a parameter for evaluating the degree of substantially uniform orientation (e.g., orientation uniformity) of the crystal grains. For example, the (101) plane is perpendicular to a migration path plane of lithium ions. As the degree of orientation of the crystal plane of the layered structure is increased, the peak intensity of the (101) plane is decreased. Therefore, because the orientation of a particular crystal plane becomes more uniform as the orientation is higher, the peak intensity of the (101) plane is decreased, so that I(003)/I(101) is increased. When the peak intensity ratio I(003)/I(101) is increased, it means that a stable positive active material structure is formed. When the peak intensity ratio I(003)/I(101) is within the above range, the stability of the crystal structure of the positive active material may be improved.

The peak intensity ratio I(003)/I(104) measured by X-ray diffraction analysis of the positive active material may be about 1.6 to about 2.0, for example about 1.6 to about 1.95, about 1.6 to about 1.9, about 1.6 to about 1.8, or about 1.6 to about 1.75 and the peak intensity ratio I(003)/I(104) measured by X-ray diffraction analysis of the electrode plate including the positive active material may be about 3.8 to about 4.5, for example, about 3.9 to about 4.4, about 4.0 to about 4.4, about 4.1 to about 4.4, or about 4.2 to about 4.4.

In the X-ray diffraction analysis, the peak intensities I(003) and I(104) respectively refer to the intensity I(003) of the (003) plane peak and the intensity I(104) of the (104) plane peak. The peak intensity ratio I(003)/I(104) is an intensity ratio of the (003) plane peak with respect to the (104) plane peak, and is a parameter for evaluating a degree of cation mixing or cation exchange. When the peak intensity ratio I(003)/I(104) of the positive active material and the electrode plate including the positive active material are both (e.g., simultaneously) within the above ranges, stability of the crystal structure of the positive active material may be improved, and an expansion ratio and a shrinkage ratio according to adsorption/release of lithium may be improved (e.g., reduced). Accordingly, the capacity characteristics of a battery may be improved.

Hereinafter, a method of preparing a positive active material according to an embodiment is described.

A method of preparing the positive active material may include mixing an aqueous solution including a nickel compound and a cobalt compound with a basic solution, performing a co-precipitation reaction, drying the resultant to prepare a transition metal precursor; mixing the transition metal precursor, a lithium compound, and an inert surfactant, and performing a heat-treatment to prepare the positive active material.

Non-limiting examples of the nickel compound include $Ni(OH)_2$, $NiO$, $NiOOH$, $NiCO_3 \cdot 2Ni(OH)_2 \cdot 4H_2O$, $NiC_2O_4 \cdot 2H_2O$, $Ni(NO_3)_2 \cdot 6H_2O$, $NiSO_4$, $NiSO_4 \cdot 6H_2O$, fatty acid nickel salts, nickel halides. These nickel compounds may be used alone or as a mixture of two or more types.

Non-limiting examples of the cobalt compound include $Co(OH)_2$, $CoOOH$, $CoO$, $Co_2O_3$, $Co_3O_4$, $Co(OCOCH_3)_2 \cdot 4H_2O$, $CoCl_2$, $Co(NO_3)_2 \cdot 6H_2O$, $CoSO_4$, and $Co(SO_4)_2 \cdot 7H_2O$. These cobalt compounds may be used alone or in mixture of two or more types.

The aqueous solution including the nickel compound and the cobalt compound may optionally (in some embodiments) further include a metal compound or manganese compound, and non-limiting examples of the metal compound include salts, oxyhydroxides, halides, and/or the like including at least one selected from Al, Fe, V, Ti, and Cr. The metal compounds may be used alone or as a mixture of two or more types.

Non-limiting examples of the manganese compound include manganese oxides (such as $Mn_2O_3$, $MnO_2$, and $Mn_3O_4$), manganese organic salts (such as manganese acetate, manganese dicarboxylate salts, manganese citrate, fatty acid manganese salts, $MnCO_3$, $Mn(NO_3)_2$, and/or $MnSO_4$), manganese oxy hydroxides, and manganese halides (such as manganese chloride). These manganese compounds may be used alone or in mixture of two or more types.

The transition metal precursor may be a high density transition metal precursor.

In order to make a high density transition metal precursor, a particle growth rate may be slowed down during the co-precipitation reaction, and the precursor may be prepared so that pores are not generated in the transition metal precursor.

The drying may be performed using any suitable condition that allows moisture to be removed without deforming the transition metal precursor structure.

For example, a slight vacuum may be applied to the resultant so that it can dry quickly and/or uniformly without raising a drying temperature.

In some embodiments, the drying may be performed at about 80° C. to about 150° C. for about 10 hours to about 30 hours. The co-precipitation reaction product may be dried at the above temperature and time ranges to obtain a high density transition metal precursor.

The transition metal precursor prepared may have a tap density of greater than 2.0 g/cm³ and less than or equal to about 2.5 g/cm³, about 2.05 g/cm³ to about 2.4 g/cm³, about 2.1 g/cm³ to about 2.3 g/cm³, or about 2.15 g/cm³ to about 2.25 g/cm³. When the tap density of the transition metal precursor exceeds 2.0 g/cm³, the single crystal particles may be easily separated and may prevent or reduce single crystal particles from growing into primary particles having independent shapes. When the tap density of the transition metal precursor is within the above-described range, the primary particles may be grown into a polycrystal composed of 2 to 10 single crystals.

The tap density refers to a mass of a powder, consisting of particles, per unit volume; for example, the density of a powder in which pores or space between particles is uniformly filled after being tapped or vibrated. Factors having an influence on the tap density may include particle size distribution, moisture content, particle shape, cohesiveness, and/or the like. The fluidity and compressibility of a material may be predicted through the tap density. The tap density may be measured based on ASTM D4781, and may be calculated using the equation TD=W/V (TD: tap density, W: weight (g) of sample, and V: volume of sample after tapping).

The transition metal precursor prepared by the above process may be a hydroxide precursor, an oxide precursor, or a combination thereof. For example, the transition metal precursor may be a compound represented by Chemical Formula 2, Chemical Formula 3, or a combination thereof:

$$Li_xNi_{1-a-b-c}Co_aMn_bM_c(OH)_2 \quad \text{Chemical Formula 2}$$

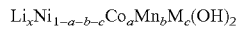

$$Li_xNi_{1-a-b-c}Co_aMn_bM_cO. \quad \text{Chemical Formula 3}$$

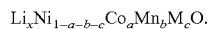

In Chemical Formula 2 and Chemical Formula 3, $0.9 \leq x \leq 1.2$, $0 < a \leq 0.4$, $0 \leq c \leq 0.1$, and M may be at least one element selected from magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), chromium (Cr), iron (Fe), vanadium (V), and a rare earth element.

The oxide precursor represented by Chemical Formula 3 may be prepared by appropriately or suitably heat treating the hydroxide precursor represented by Chemical Formula 2.

Subsequently, the transition metal precursor, the lithium compound, and the inert surfactant may be mixed and heat-treated to prepare a positive active material according to an embodiment.

In some embodiments, the transition metal precursor and the lithium compound may be mixed so that the Li/transition metal (transition metals excluding Li) mole ratio may be greater than about 1.0 and less than about 1.1, for example, about 1.01 to about 1.06. Thus, the crystallinity of the primary particles included in the positive active material may be improved.

The inert surfactant may be or include $MgSO_4$, $Na_2SO_4$, NaCl, KCl, $NH_4Cl$, $MgCl_2$, $NaHCO_3$, and/or the like. The inert surfactant may be added in an amount of less than or equal to 1 part by weight, for example, less than or equal to about 0.5 parts by weight, about 0.05 to about 0.5 parts by weight, or about 0.1 to about 0.5 parts by weight based on 100 parts by weight of the transition metal precursor. When an excessive amount of the inert surfactant is added, the crystal structure of the positive active material may be deformed. On the other hand, when a small (insufficient) amount of the inert surfactant is added, it may be difficult to suppress a grain boundary growth (interface growth) of the particles, and it may grow into primary particles having independent shapes.

The lithium compound may be or include lithium hydroxide, lithium carbonate, lithium sulfate, lithium nitrate, or a combination thereof.

The heat-treating may be performed at a temperature higher than the heat-treating temperature for producing a related art positive active material, in some embodiments, for example, the heat-treating may be performed for about 15 hours to about 25 hours at a temperature of more than about 800° C. and less than about 900° C., or about 830° C. to about 870° C. When the heat-treating temperature and the reaction time are within the above-described ranges, overgrowth of the secondary particles or the primary particles constituting the positive active material may be suppressed or reduced. In addition, the positive active material according to the embodiment may be prepared by mixing the high density precursor, an excess of the lithium compound (Li/transition metal mole ratio of more than 1.0 and less than 1.1), and the inert surfactant, and then by heat-treating the resultant within the above temperature range.

The heat-treating process may be performed in an oxidizing gas atmosphere including about 80 volume % to about 100 volume % of oxygen ($O_2$), thereby accelerating a calcination reaction.

Another embodiment provides a rechargeable lithium battery including a positive electrode including the positive active material; a negative electrode including a negative active material; and an electrolyte.

The positive electrode may include a positive current collector and a positive active material layer formed on the positive current collector. The positive active material layer may include the positive active material, a binder, and optionally a conductive material.

The positive current collector may include aluminum, nickel, and/or the like, but is not limited thereto. The positive active material layer may include the positive active material and may optionally include a positive binder and a conductive material.

The positive active material is as described above, and may be included in an amount of about 95 wt % to 99 wt % based on a total amount of the positive active material layer.

The positive active material layer may optionally further include a conductive material and a binder.

The conductive material is included to improve electrode conductivity. Any electrically conductive material may be used as a conductive material unless it causes an unwanted chemical change (e.g., reaction). Non-limiting examples of the conductive material include a carbon-based material (such as natural graphite, artificial graphite, carbon black, acetylene black, ketjen black, carbon fiber and/or the like); a metal-based material (such as a metal powder and/or a metal fiber including copper, nickel, aluminum, silver, and/or the like); a conductive polymer (such as a polyphenylene derivative); and/or a mixture thereof.

The binder may adhere the positive active material particles to each other, and may also adhere the positive active material to the current collector. The binder may be or include a non-water-soluble binder, a water-soluble binder, or a combination thereof.

The non-water-soluble binder may include an ethylene propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be a styrene-butadiene rubber (SBR), an acrylated styrene butadiene rubber (ABR), an acrylonitrile butadiene rubber, an acrylic rubber, a butyl rubber, a fluorine rubber, or a combination thereof. The polymer resin binder may be selected from polypropylene, an ethylene oxide-containing polymer, polyvinylpyrrolidone, polyepichlorohydrin, polyphosphazene, an ethylene propylene diene copolymer, polyvinylpyridine, chlorosulfonated polyethylene, latex, a polyester resin, an acrylic resin, a phenolic resin, an epoxy resin, polyvinyl alcohol, and combinations thereof.

When a water-soluble binder is used as the positive binder, it may further include a cellulose-based compound that may impart viscosity as a thickener. As the cellulose-based compound, one or more types or kinds of carboxymethyl cellulose, hydroxypropylmethyl cellulose, methyl cellulose, alkali metal salts thereof, and/or the like may be included. The alkali metal may include sodium (Na), potassium (K), or Li. The thickener may be included in an amount of about 0.1 parts by weight to 3 parts by weight based on 100 parts by weight of the positive active material.

The negative electrode may include a negative current collector and a negative active material layer disposed on the negative current collector, and in some embodiments may further include a negative functional layer disposed on the negative active material layer.

The negative current collector may be selected from a copper foil, a nickel foil, a stainless steel foil, a titanium foil, a nickel foam, a copper foam, a polymer substrate coated with a conductive metal, and combinations thereof.

The negative active material layer may be disposed on the negative current collector. The negative active material layer may include a negative active material, and may optionally include a negative conductive material and a negative binder.

The negative active material may include a material that reversibly intercalates/deintercalates lithium ions, a lithium metal, a lithium metal alloy, a material capable of doping/dedoping lithium, and/or a transition metal oxide.

Non-limiting examples of the material capable of reversibly intercalating/deintercalating the lithium ions may include a carbonaceous material, for example, a carbon-based negative active material generally used in a rechargeable lithium battery. Non-limiting examples of the carbon-based negative active material include crystalline carbon, amorphous carbon, and combinations thereof. The crystalline carbon may be non-shaped (e.g., having no particular shape), or sheet, flake, spherical, and/or fiber shaped natural graphite and/or artificial graphite. The amorphous carbon may be a soft carbon, a hard carbon, a mesophase pitch carbonization product, fired coke, and/or the like.

The lithium metal alloy may be or include an alloy of lithium and a metal selected from Na, K, rubidium (Rb), cesium (Cs), francium (Fr), beryllium (Be), Mg, Ca, Sr, silicon (Si), antimony (Sb), lead (Pb), indium (In), Zn, barium (Ba), radium (Ra), germanium (Ge), aluminum (Al), and tin (Sn).

The material capable of doping/dedoping lithium may be a silicon-based material, for example, Si, $SiO_x$ (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and combinations thereof\), a Si-carbon composite, Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and combinations thereof), a Sn-carbon composite, and/or the like. At least one of these materials may be mixed with $SiO_2$. The elements Q and R may each independently be selected from Mg, Ca, Sr, Ba, Ra, scandium (Sc), yttrium (Y), Ti, Zr, hafnium (Hf), rutherfordium (Rf), V, Nb, tantalum (Ta), dubnium (db), Cr, Mo, W, seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), boron (B), Al, Ga, Sn, In, thallium (Tl), Ge, phosphorus (P), arsenic (As), antimony (Sb), bismuth (Bi), sulfur (S), selenium (Se), tellurium (Te), polonium (Po), and combinations thereof.

The transition metal oxide may be or include a lithium titanium oxide.

The negative active material may be included in an amount of about 95 wt % to about 99 wt % based on a total amount of the negative active material layer.

The negative active material layer may optionally further include a negative conductive material and a negative binder. The negative conductive material and the negative binder may the same as described for the positive conductive material and the positive binder, respectively.

The electrolyte may include a non-aqueous organic solvent and a lithium salt.

The non-aqueous organic solvent may serve as a medium for transferring ions taking part in the electrochemical reaction of the battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like; and the ester-based solvent may include methyl acetate, ethyl acetate, n-propyl acetate, t-butyl acetate, methylpropionate, ethylpropionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like; and the ketone-based solvent may include cyclohexanone and/or the like. The alcohol-based solvent may include ethyl alcohol, isopropyl alcohol, and so on, and non-limiting examples of the aprotic solvent include nitriles such as R—CN (wherein R is a C2 to C20 linear, branched, and/or cyclic hydrocarbon group that may include a double bond, an aromatic ring, and/or an ether bond), amides (such as dimethylformamide), dioxolanes (such as 1,3-dioxolane), sulfolanes, and so on.

The non-aqueous organic solvent may be used alone or as a mixture of two or more. When the organic solvent is used in a mixture, the mixture ratio can be controlled in accordance with a desirable or suitable battery performance.

The carbonate-based solvent may include a mixture of a cyclic carbonate and a chain carbonate.

The cyclic carbonate and the chain carbonate may be mixed together at a volume ratio of about 1:1 to about 1:9, and when the mixture is used as an electrolyte, the electrolyte performance may be enhanced.

The non-aqueous organic solvent of the present disclosure may further include an aromatic hydrocarbon-based organic solvent in addition to the carbonate based solvent. In this case, the carbonate-based solvent and the aromatic hydrocarbon-based organic solvent may be mixed in a volume ratio of about 1:1 to about 30:1.

In some embodiments, the aromatic hydrocarbon-based organic solvent may be represented by Chemical Formula 4:

Chemical Formula 4

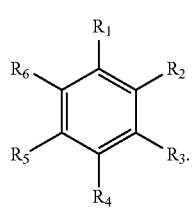

In Chemical Formula 4, $R_1$ to $R_6$ may independently be selected from hydrogen, a halogen, a C1 to C10 alkyl group, a haloalkyl group, and combinations thereof.

Non-limiting examples of aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The non-aqueous electrolyte may further include vinylene carbonate or an ethylene carbonate-based compound represented by Chemical Formula 5 in order to improve battery cycle-life:

Chemical Formula 5

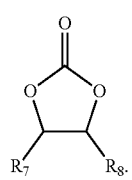

In Chemical Formula 5, $R_7$ and $R_8$ may independently be selected from hydrogen, a halogen group, a cyano group (CN), a nitro group ($NO_2$), and a fluorinated C1 to C5 alkyl group, and $R_7$ and $R_8$ may not both (simultaneously) be hydrogen.

Non-limiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and/or the like. The amount of the cycle-life improvement additive may be used within an appropriate or suitable range.

The lithium salt according to an embodiment dissolved in an organic solvent supplies the battery with lithium ions, basically operates the rechargeable lithium battery, and facilitates lithium ion transport between the positive electrode and the negative electrode. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$, $LiC_4F_9SO_3$, $LiClO_4$, $LiAlO_2$, $LiAlCl_4$, $LiN(C_xF_{2x+1}SO_2)(CyF_{2y+1}SO_2)$, (wherein x and y are natural numbers), LiCl, LiI, and $LiB(C_2O_4)_2$ (lithium bis(oxalato) borate, LiBOB). A concentration of the lithium salt may range from about 0.1 M to about 2.0 M. When the lithium salt is included at the above concentration range, an electrolyte may have excellent performance and/or lithium ion mobility due to optimal or suitable electrolyte conductivity and/or viscosity.

A separator may be disposed between the positive electrode and the negative electrode. The separator may be selected from, for example, a glass fiber, polyester, polyethylene, polypropylene, polytetrafluoroethylene, and combinations thereof, and may be in the form of a non-woven fabric or a woven fabric. For example, for the rechargeable lithium battery, a polyolefin-based polymer separator (such as polyethylene, polypropylene and/or the like) may be used. In order to ensure heat resistance and/or mechanical strength, a coated separator including a ceramic component or a polymer material may be used. The separator may have a mono-layered or a multi-layered structure.

A rechargeable lithium battery may be classified as a lithium ion battery, a lithium ion polymer battery, or a lithium polymer battery depending on the type or kinds of separator and electrolyte included therein. The battery may also be classified as cylindrical, prismatic, coin-type, pouch-type, and/or the like depending on shape. The battery may be bulk type or thin film type, depending on its size and form factor. Structures and manufacturing methods for such batteries pertaining to this disclosure are well known in the art.

Hereinafter, as an example of a rechargeable lithium battery, a cylindrical rechargeable lithium battery is described.

FIG. 1 is an exploded perspective view of a rechargeable lithium battery according to an embodiment.

Referring to FIG. 1, a rechargeable lithium battery 21 according to an embodiment includes a battery cell including a negative electrode 22, a positive electrode 23 facing the negative electrode 22, and a separator 24 disposed between the negative electrode 22 and the positive electrode 23, and an electrolyte impregnating the negative electrode 22, the positive electrode 23, and the separator 24, a battery case 25 including the battery cell, and a cap assembly 26 sealing the battery case 25.

Hereinafter, the above aspects of the present disclosure are illustrated in more detail with reference to examples. However, the present disclosure is not limited to these examples.

EXAMPLES

Example 1

$NiSO_4$, $CoSO_4$, and $MnSO_4$ were each prepared as an aqueous solution at a concentration of 1.5 M, and amounts of the aqueous solutions were adjusted for a synthesis of a compound having a composition of $Ni_{0.8}Co_{0.1}Mn_{0.1}(OH)_2$ and then added to a co-precipitation reactor to synthesize co-precipitation precipitates. An ammonia aqueous solution was added thereto to form a complex compound, and the pH was adjusted to 11 by adjusting the concentration of the ammonia aqueous solution and an amount of sodium hydroxide to uniformly grow the co-precipitation precipitates. When the co-precipitation precipitates had an average particle diameter of 10 μm to 12 μm and tap density of 2.2 g/cc, the reaction was stopped, and the co-precipitation precipitates were separated. Subsequently, the co-precipitation precipitates were heat-treated (dried) in a 120° C. vacuum oven for 10 hours to prepare a transition metal hydroxide precursor having the composition of $Ni_{0.8}Co_{0.1}Mn_{0.1}(OH)_2$.

After first mixing 0.2 mol % of $MgSO_4$ with the transition metal hydroxide precursor, a lithium compound (lithium hydroxide:lithium carbonate mixed in a mole ratio of 1.0: 0.5) was mixed therewith in a Li/(Ni+Co+Mn) mole ratio of 1.01, and then heat-treated at 850° C. under an oxidizing gas atmosphere including oxygen at 80 to 100 volume % for 20 hours to prepare a positive active material.

The positive active material included a primary particle (a polycrystal including (e.g., consisting of) 2 to 3 single crystals and having a particle diameter of 3 μm to 5 μm, wherein the single crystals had a particle diameter of 2 μm to 3 μm) and a secondary particle having a particle diameter of greater than or equal to 10 μm, and the composition was $Li_{1.01}Ni_{0.8}Co_{0.1}Mn_{0.1}O_2$. The reported sizes were measured based on a cross section of the secondary particle.

The positive active material, a carbon conductive material (Denka Black, Denka Korea Co., Ltd.), and polyvinylidene fluoride (PVDF) were mixed in a weight ratio of 94:3:3, and the mixture was mixed with N-methyl pyrrolidone (NMP) to prepare a slurry. The slurry was bar-coated on a 15 μm-thick aluminum current collector and dried, dried again at 120° C. under vacuum, compressed, and punched to manufacture a 45 μm-thick positive electrode plate.

The positive electrode plate was combined with a lithium metal foil as a counter electrode, a PTFE (polytetrafluoroethylene) separator was disposed between the positive electrode and the counter electrode, and an electrolyte was impregnated thereinto to manufacture a coin cell. Herein, the electrolyte was prepared by mixing 1.3 M of $LiPF_6$ with a mixed solvent of EC (ethylene carbonate), DEC (diethyl carbonate), and EMC (ethylmethyl carbonate) (at a volume ratio of 2:4:4).

Comparative Example 1

$NiSO_4$, $CoSO_4$, and $MnSO_4$ were each prepared as an aqueous solution at a concentration of 1.5 M, and amounts of the aqueous solutions were adjusted for a synthesis of a compound having a composition of $Ni_{0.8}Co_{0.1}Mn_{0.1}(OH)_2$ and then added to a co-precipitation reactor to synthesize co-precipitation precipitates. An ammonia aqueous solution was added thereto to form a complex compound, and the pH was controlled by adjusting the concentration of the ammonia aqueous solution and an amount of sodium hydroxide in order to uniformly grow the co-precipitation precipitates. When the co-precipitation precipitates had an average particle diameter of 5 μm to 7 μm and tap density of 2.0 g/cc, the reaction was stopped, and the co-precipitation precipitates were separated. Subsequently, the co-precipitation precipitates were heat-treated (dried) in a 120° C. vacuum oven for 10 hours to prepare a transition metal hydroxide precursor having the composition of $Ni_{0.8}Co_{0.1}Mn_{0.1}(OH)_2$.

The transition metal hydroxide precursor was mixed with a lithium compound (lithium hydroxide:lithium carbonate mixed with a mole ratio of 1.0:0.5) in a Li/(Ni+Co+Mn) mole ratio of 1.01, and then heat-treated at 900° C. under an oxidizing gas atmosphere including oxygen at 80 to 100 volume % for 20 hours to prepare a positive active material.

The positive active material included a primary particle (a single crystal having a particle diameter of 3 μm to 5 μm) and a secondary particle having a particle diameter of 5 μm to 7 μm, and the composition was $Li_{1.01}Ni_{0.8}Co_{0.1}Mn_{0.1}O_2$. The reported sizes were measured based on a cross section of the secondary particle.

A coin cell was manufactured according to substantially the same method as Example 1 except that the prepared positive active material was used.

Comparative Example 2

$NiSO_4$, $CoSO_4$, and $MnSO_4$ was each prepared as an aqueous solution at a concentration of 1 M to 2 M, and amounts of the aqueous solutions were adjusted for a synthesis of a compound having a composition of $Ni_{0.8}Co_{0.1}Mn_{0.1}(OH)_2$ and then added to a co-precipitation reactor to synthesize co-precipitation precipitates. An ammonia aqueous solution was added thereto to form a complex compound, and a concentration of the ammonia aqueous solution and an amount of sodium hydroxide were adjusted to control pH, so that the co-precipitation precipitates might uniformly grow. When the co-precipitation precipitates had an average particle diameter of 10 μm to 12 μm and tap density of 2.0 g/cc, the reaction was stopped, and the co-precipitation precipitates were separated. Subsequently, the co-precipitation precipitates were heat-treated (dried) in a 120° C. vacuum oven for 10 hours to prepare a transition metal hydroxide precursor having the composition of $Ni_{0.8}Co_{0.1}Mn_{0.1}(OH)_2$.

The transition metal hydroxide precursor was mixed with a lithium compound (a mole ratio of lithium hydroxide: lithium carbonate=1.0:0.5) in a Li/(Ni+Co+Mn) mole ratio of 1.01, and then heat-treated at 850° C. under an oxidizing gas atmosphere including oxygen at 80 to 100 volume % for 20 hours to prepare a positive active material.

The positive active material included a primary particle (a single crystal having a particle diameter of 0.5 μm) and a secondary particle having a particle diameter of greater than or equal to 10 μm, and the composition thereof was $Li_{1.01}Ni_{0.8}Co_{0.1}Mn_{0.1}O_2$. The reported sizes were measured based on a cross section of the secondary particle.

A coin cell was manufactured according to substantially the same method as Example 1 except that this positive active material was used.

The positive active materials according to Example 1 and Comparative Examples 1 and 2 were measured or analyzed to determine a particle diameter of the secondary particles, a particle diameter of the primary particles, the number and a size of single crystals forming the polycrystalline primary particles, and the compositions, which are shown in Table 1. The results shown in Table 1 are measured based on a cross section of the secondary particles.

TABLE 1

| | Single crystal | | Primary particle | | Secondary particle |
|---|---|---|---|---|---|
| | Particle diameter (μm) | Composition | Particle diameter (μm) | The number of single crystals | Particle diameter (μm) |
| Example 1 | 2 to 3 | $Li_{1.01}Ni_{0.8}Co_{0.1}Mn_{0.1}O_2$ | 3-5 | 2 to 5 | 10 or more |
| Comparative Example 1 | 3 to 5 | | 3-5 | 1 | 5 to 7 |
| Comparative Example 2 | 0.5 | | 0.5 | 1 | 10 or more |

Evaluation Example 1: Electron Backscatter Diffraction (EBSD) Analysis and Scanning Electron Microscope (SEM) Analysis An EBSD analysis and a SEM analysis were performed with respect to the positive active materials according to Example 1 and Comparative Examples 1 and 2.

The EBSD analysis was performed using a Bruker QUANTAX EBSD (Electron Backscatter Diffraction), and the specimens used therein were ion-milled through cross-sectional polishing (+, Gatan Inc.). EBSD was measured using an e-flash HR EBSD detector (made by Bruker Corp.) at an acceleration voltage of 20 keV. EBSD images of the positive active materials of Example 1 and Comparative Examples 1 and 2 are respectively shown in FIGS. 2A, 3A, and 4A.

Figure 2A:
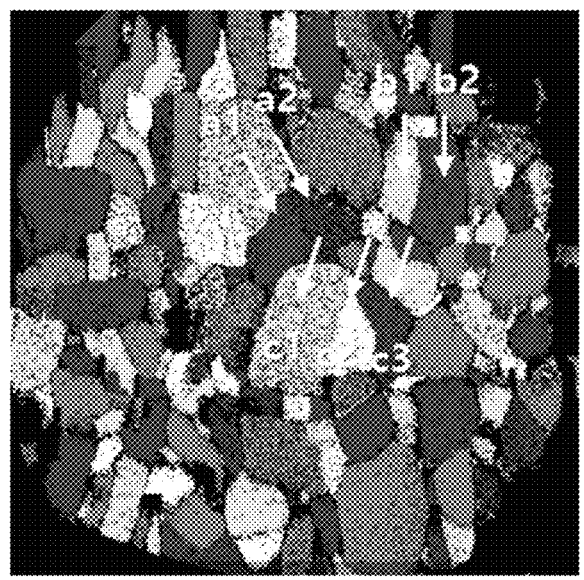
FIGS. 2A, 3A, and 4A are electron backscatter diffraction (EBSD) images of the positive active materials prepared according to Example 1, Comparative Example 1, and Comparative Example 2, respectively.
Figure 2B:
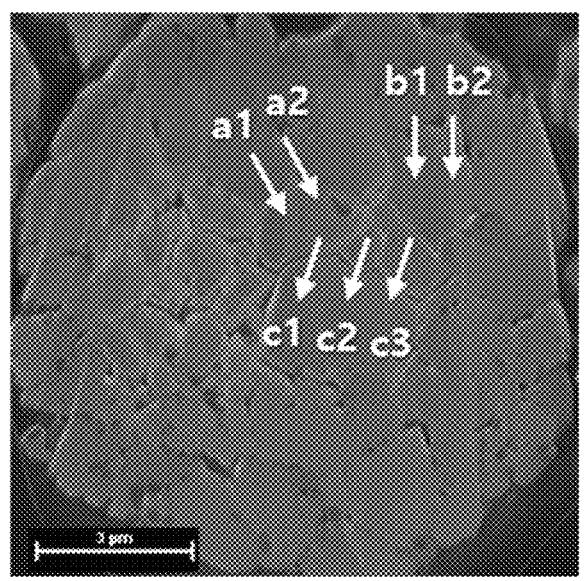
FIGS. 2B, 3B, and 4B are scanning electron microscope (SEM) images of the positive active materials prepared according to Example 1, Comparative Example 1, and Comparative Example 2, respectively.
Figure 3A:
Figure 3B:
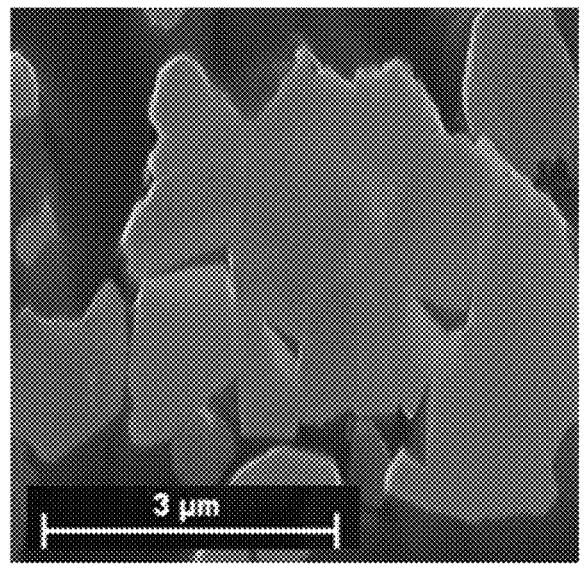
Figure 4A:
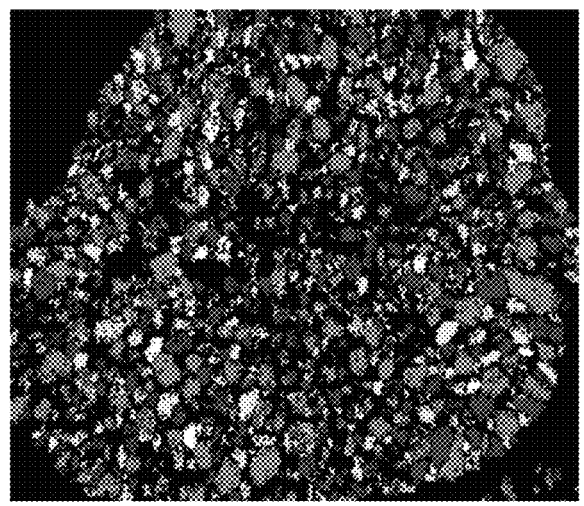
Figure 4B:
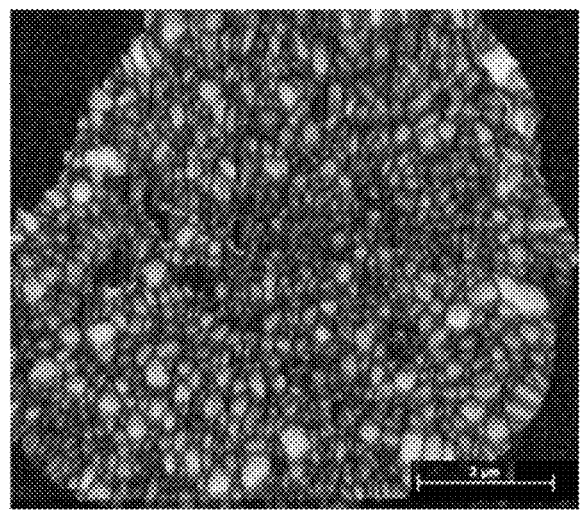

SEM images of the positive active materials according to Example 1 and Comparative Examples 1 and 2 are respectively shown in FIGS. 2B, 3B, and 4B.

EBSD (Electron Backscatter Diffraction) is a crystal orientation analysis method positioned between XRD (X-Ray Diffraction) analysis and TEM (Transmission Electron Microscopy) analysis, which is performed to confirm crystal orientation (orientation information) forming a refined structure of a material. Compared with the XRD analysis that measures the full orientation distribution of the material, the EBSD analysis does not measure or analyze a bulk material, but instead analyzes a local cross section, surface, and/or the like. While EBSD analysis does not provide the level of analysis, precision, and resolution of TEM, EBSD can show the orientation distribution of crystals inside a particle in a SEM examination region.

Referring to FIGS. 2A and 2B, comparing the EBSD and SEM images of the positive active material according to Example 1, the secondary particles had a particle diameter of greater than or equal to 10 μm, the primary particles had a particle diameter of 3 μm to 5 μm, the polycrystalline primary particle was composed of 2 to 5 (single oriented) single crystals, and the single crystals had an average particle diameter of 2 μm to 3 μm. In FIG. 2A, the arrow marks show a polycrystalline primary particle composed of two single crystals (a1 and a2, or b1 and b2), and a polycrystalline primary particle composed of 3 single crystals (c1, c2, and c3).

Referring to FIGS. 3A and 3B, comparing the EBSD and SEM images of the positive active material according to Comparative Example 1, the secondary particles had a particle diameter of 5 μm to 7 μm, and most of the primary particles were composed of one single crystal (each primary particle included one single crystal), and had an average particle diameter of 3 μm to 5 μm.

Referring to FIGS. 4A and 4B, comparing the EBSD and SEM images of the positive active material according to Comparative Example 2, the secondary particles had a particle diameter of greater than equal to 10 μm, and most of the primary particles were composed of one single crystal and had an average particle diameter of less than 1 μm (about 0.5 μm).

Evaluation Example 2: Mixture Density of Positive Active Material

The mixture density of each of the positive active materials according to Example 1 and Comparative Examples 1 and 2 was measured.

The mixture density was measured and recorded within a range of 3.0000 g (an error range ±0.0004 g) of the positive active materials. For example, the positive active materials were respectively maintained under a pressure of 3 tons for 30 seconds using a 13 mm-sized KBr pellet die, and then measured with respect to height decreased and weight per volume, which were converted into density, and the results are shown in Table 2.

TABLE 2

| | Mixture density (g/cm³) |
|---|---|
| Example 1 | 3.6 |
| Comparative Example 1 | 3.5 |
| Comparative Example 2 | 3.5 |

Referring to Table 2, a mixture density of the positive active material according to Example 1 was improved compared with those of Comparative Examples 1 and 2.

Evaluation Example 3: X-Ray Diffraction (XRD) Analysis

XRD analyses of the positive active material powders according to Example 1 and Comparative Examples 1 and 2, and XRD analyses of the corresponding positive electrode plates were performed.

The peak intensity I(003) with respect to a (003) plane, the peak intensity I(104) with respect to a (104) plane, and the peak intensity I(101) with respect to a (101) plane were measured, and the peak intensity ratios I(003)/I(101) and I(003)/I(104) were calculated therefrom as shown in Table 3.

The XRD analysis was performed using an Xpert PRO, Philips/Power 3 kW and a CuK-alpha characteristic X ray wavelength of 1.541 Å as an excitation source, and a Rietveld analysis was performed.

TABLE 3

| | Peak intensity ratio I(003)/I(101) (positive active material) | Peak intensity ratio I(003)/I(104) (positive active material) | Peak intensity ratio I(003)/I(104) (positive electrode plate) |
|---|---|---|---|
| Example 1 | 10.2356 | 1.7212 | 4.3491 |
| Comparative Example 1 | 8.9755 | 1.4949 | 3.7124 |
| Comparative Example 2 | 8.9773 | 1.5535 | 1.7000 |

Referring to Table 3, the peak intensity ratios of the positive active material and the positive electrode plate of Example 1 were all higher than those of Comparative Examples 1 and 2. As a result, the positive active material of Example 1 exhibited a structure associated with improved structural stability, and expansion and shrinkage rates thereof were expected to be reduced unlike the positive active materials of Comparative Examples 1 and 2.

Evaluation Example 4: High Temperature Gas Generation Amount

The coin cells according to Example 1 and Comparative Examples 1 and 2 were each constant current-charged at 0.1 C up to a voltage of 4.3 V (vs. Li) at room temperature (25° C.) in the 1st cycle, and subsequently maintained at 4.3 V in a constant voltage mode with a cut off current of 0.05 C. Subsequently, the cells were discharged at a constant current of 0.1 C down to a voltage of 3.0 V (vs. Li). In the $2^{nd}$ cycle, the coin cells were constant current-charged at a current of a 0.1 C rate up to a voltage of 4.3 V (vs. Li) at 25° C., maintained at 4.3 V in a constant voltage mode with a cut off current of 0.05 C, and then disassembled, and the electrode plates taken therefrom were each placed in a pouch with an electrolyte solution and stored in an 80° C. oven. Mass changes were calculated from pouch volume changes using an Archimedes method, and the results are shown in FIG. 5.

Figure 5:
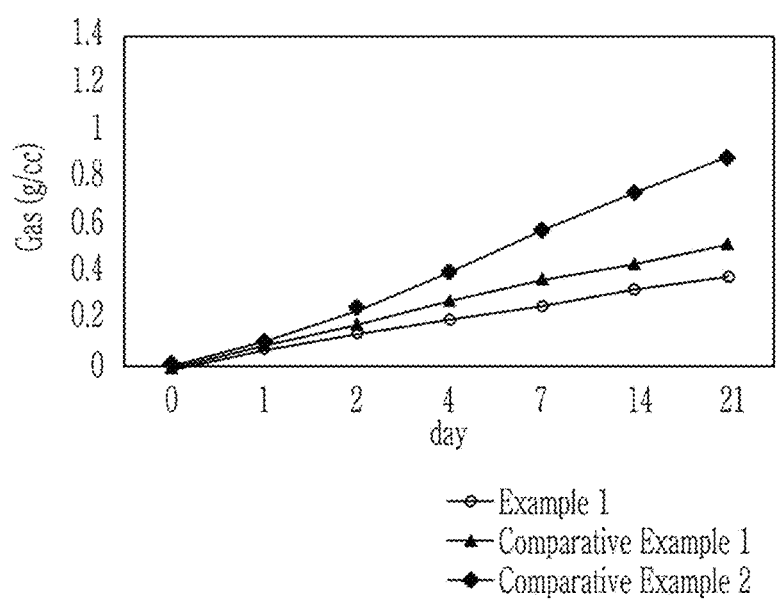
FIG. 5 is a graph showing cumulative high-temperature gas generation amounts of the coin cells prepared according to Example 1, Comparative Example 1, and Comparative Example 2.

Referring to FIG. 5, the coin cell of Example 1 exhibited a greatly reduced gas generation amount compared with the coins cells of Comparative Examples 1 and 2.

Evaluation Example 5: Evaluation of High-temperature Cycle-Life Characteristics

The coin cells of Example 1 and Comparative Examples 1 and 2 after the 1st cycle in Evaluation Example 4 were constant current-charged at 1.0 C up to a voltage of 4.30 V (vs. Li) at 45° C., and subsequently maintained at 4.30 V in a constant voltage mode with a cut off current of 0.05 C. Subsequently, the coin cells were discharged down to a voltage of 3.0 V (vs. Li) at a constant current of a 1.0 C, and this charge and discharge cycle was repeated up to the 100th cycle. A pause (rest) was set for 10 minutes after each charge/discharge cycle. The charge and discharge experiment results and 100th cycle capacity retentions are shown in Table 4.

TABLE 4

| | Discharge capacity at $1^{st}$ cycle (mAh/g) | Discharge capacity at $100^{th}$ cycle (mAh/g) | Capacity retention at $100^{th}$ cycle (%) |
|---|---|---|---|
| Example 1 | 196 | 174 | 88.8 |
| Comparative Example 1 | 193 | 163 | 84.5 |
| Comparative Example 2 | 200 | 130 | 65.0 |

Referring to Table 4, the coin cell of Example 1 exhibited improved high temperature discharge capacity and high temperature cycle-life characteristics compared with the coin cells of Comparative Examples 1 and 2.

Evaluation Example 6: Evaluation of High-Voltage Cycle-Life Characteristics

The coin cells of Example 1 and Comparative Examples 1 and 2 after the 1st cycle in Evaluation Example 4 were constant current-charged at 1.0 C up to a voltage of 4.45 V (vs. Li) at 25° C., and subsequently maintained at 4.45 V in a constant voltage mode with a cut-off current of 0.05 C in order to compare material characteristics depending on a high voltage. Subsequently, the coin cells were discharged down to a voltage of 3.0 V (vs. Li) at a constant current of 1.0 C, and this charge and discharge program was repeated up to the 100th cycle. A 10 minute pause (rest) was set after each charge/discharge cycle. The charge and discharge experiment result and capacity retentions at the 100th cycle are shown in Table 5.

TABLE 5

| | Discharge capacity at $1^{st}$ cycle (mAh/g) | Discharge capacity at $100^{th}$ cycle (mAh/g) | Capacity retention at $100^{th}$ cycle (%) |
|---|---|---|---|
| Example 1 | 205 | 189 | 92.2 |
| Comparative Example 1 | 203 | 183 | 90.1 |
| Comparative Example 2 | 211 | 161 | 76.3 |

Referring to Table 5, the coin cell of Example 1 exhibited improved high voltage discharge capacity and high voltage cycle-life characteristics compared with the coin cells of Comparative Examples 1 and 2.

As used herein, the terms "substantially", "about", and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the present disclosure has been described in connection with what is presently considered to be practical example embodiments, it is to be understood that the present disclosure is not limited to the disclosed embodiments. On the contrary, it is intended to cover various modifications and equivalent arrangements included within the scope of the appended claims and equivalents thereof.

| Description of some of the symbols | |
|---|---|
| 21: rechargeable lithium battery | 22: negative electrode |
| 23: positive electrode | 24: separator |
| 25: battery case | 26: cap assembly |

What is claimed is:

1. A positive active material for a rechargeable lithium battery, the positive active material comprising:
   nickel-based lithium transition metal oxide secondary particles in which a plurality of primary particles are aggregated,
   wherein the primary particles each comprise polycrystalline primary particles composed of 2 to 10 single crystals, and
   each of the single crystals has a particle diameter of about 0.5 μm to about 3 μm.

2. The positive active material of claim 1, wherein the polycrystalline primary particles are about 30% or more of the total number of primary particles.

3. The positive active material of claim 1, wherein the primary particle has a particle diameter of about 2 μm to about 5 μm.

4. The positive active material of claim 1, wherein the secondary particle has a particle diameter of about 10 μm to about 40 μm.

5. The positive active material of claim 1, wherein a peak intensity ratio I(003)/I(101) measured by X-ray diffraction analysis of the positive active material is about 9 to about 11.

6. The positive active material of claim 1, wherein a peak intensity ratio I(003)/I(104) measured by X-ray diffraction analysis of the positive active material is about 1.6 to about 2.0, and
   a peak intensity ratio I(003)/I(104) measured by X-ray diffraction analysis of an electrode plate comprising the positive active material is about 3.8 to about 4.5.

7. The positive active material of claim 1, wherein the nickel-based lithium transition metal oxide is represented by Chemical Formula 1:

$$Li_xNi_{1-a-b-c}Co_aMn_bM_cO_2 \quad \text{Chemical Formula 1}$$

wherein, in Chemical Formula 1,
$0.9 \leq x \leq 1.2$, $0 < a \leq 0.4$, $0 \leq b \leq 0.4$, $0 \leq c \leq 0.1$, and
M is at least one element selected from Mg, Ca, Sr, Ba, Ti, Zr, Nb, Mo, W, Zn, Al, Si, Cr, Fe, V, and a rare earth element.

8. The positive active material of claim 1, wherein the nickel-based lithium transition metal oxide comprises $LiNi_{0.9}Co_{0.08}Al_{0.02}O_2$, $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$, $Li_{1.01}Ni_{0.8}Co_{0.1}Mn_{0.1}O_2$, or a combination thereof.

9. A method of preparing the positive active material of claim 1, the method comprising:
   mixing an aqueous solution comprising a nickel compound and a cobalt compound with a basic solution;
   performing a co-precipitation reaction to prepare a resultant;
   drying the resultant to prepare a transition metal precursor;
   mixing the transition metal precursor, a lithium compound, and an inert surfactant; and
   performing a heat-treatment.

10. The method of claim 9, wherein the transition metal precursor has a tap density of greater than about 2.0 g/cm³ and less than or equal to about 2.5 g/cm³.

11. The method of claim 9, wherein the transition metal precursor is a compound represented by Chemical Formula 2, Chemical Formula 3, or a combination thereof:

$$Li_xNi_{1-a-b-c}Co_aMn_bM_c(OH)_2 \quad \text{Chemical Formula 2}$$

$$Li_xNi_{1-a-b-c}Co_aMn_bM_cO, \quad \text{Chemical Formula 3}$$

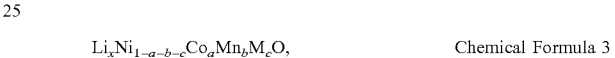

wherein, in Chemical Formula 2 and Chemical Formula 3,
$0.9 \leq x \leq 1.2$, $0 < a \leq 0.4$, $0 \leq c \leq 0.1$, and
M is at least one element selected from Mg, Ca, Sr, Ba, Ti, Zr, Nb, Mo, W, Zn, Al, Si, Cr, Fe, V, and a rare earth element.

12. The method of claim 9, wherein the transition metal precursor and the lithium compound are mixed so that a Li/metal (transition metals excluding Li) mole ratio is greater than about 1.0 and less than about 1.1.

13. The method of claim 9, wherein the lithium compound is lithium hydroxide, lithium carbonate, lithium sulfate, lithium nitrate, or a combination thereof.

14. The method of claim 9, wherein the inert surfactant is in an amount of less than or equal to about 1 part by weight based on 100 parts by weight of the transition metal precursor.

15. The method of claim 9, wherein the heat-treatment is maintained for about 15 hours to about 25 hours at a temperature of greater than about 800° C. and less than 900° C.

16. A rechargeable lithium battery comprising:
   a positive electrode comprising the positive active material of claim 1;
   a negative electrode comprising a negative active material; and
   an electrolyte.

* * * * *

UNITED STATES PATENT AND TRADEMARK OFFICE
CERTIFICATE OF CORRECTION

| | |
|---|---|
| PATENT NO. | : 11,349,122 B2 |
| APPLICATION NO. | : 16/817163 |
| DATED | : May 31, 2022 |
| INVENTOR(S) | : Youngsun Kong et al. |

It is certified that error appears in the above-identified patent and that said Letters Patent is hereby corrected as shown below:

In the Claims

Column 19, Line 49, Claim 7     Delete "COa" and
Chemical Formula 1              Insert -- Coa --

Signed and Sealed this
Fourth Day of July, 2023

Katherine Kelly Vidal
*Director of the United States Patent and Trademark Office*